United States Patent
Zettsu et al.

(10) Patent No.: US 12,537,191 B2
(45) Date of Patent: Jan. 27, 2026

(54) NEGATIVE ELECTRODE ACTIVE MATERIAL FOR RECHARGEABLE BATTERY, METHOD FOR PRODUCING THE SAME, AND RECHARGEABLE BATTERY

(71) Applicant: SHINSHU UNIVERSITY, Matsumoto (JP)

(72) Inventors: Nobuyuki Zettsu, Nagano (JP); Katsuya Teshima, Nagano (JP); Hyemin Kim, Nagano (JP)

(73) Assignees: SHINSHU UNIVERSITY, Matsumoto (JP); MEIJO NANO CARBON CO., LTD., Nagoya (JP)

( * ) Notice: Subject to any disclaimer, the term of this patent is extended or adjusted under 35 U.S.C. 154(b) by 989 days.

(21) Appl. No.: 17/275,022

(22) PCT Filed: Nov. 22, 2019

(86) PCT No.: PCT/JP2019/045770
§ 371 (c)(1),
(2) Date: Mar. 10, 2021

(87) PCT Pub. No.: WO2020/105731
PCT Pub. Date: May 28, 2020

(65) Prior Publication Data
US 2022/0069295 A1 Mar. 3, 2022

(30) Foreign Application Priority Data
Nov. 22, 2018 (JP) ................................ 2018-219705

(51) Int. Cl.
*H01M 4/38* (2006.01)
*H01M 4/02* (2006.01)
*H01M 4/587* (2010.01)

(52) U.S. Cl.
CPC ........... *H01M 4/386* (2013.01); *H01M 4/587* (2013.01); *H01M 2004/027* (2013.01)

(58) Field of Classification Search
CPC . H01M 4/386; H01M 4/587; H01M 2004/027
See application file for complete search history.

(56) References Cited

U.S. PATENT DOCUMENTS

2010/0193731 A1* 8/2010 Lee ........................ H01M 4/485
977/932
2014/0346618 A1* 11/2014 Lahlouh .............. H01M 4/0402
438/49

(Continued)

FOREIGN PATENT DOCUMENTS

| CN | 103545493 A | 1/2014 |
| CN | 104319367 A | 1/2015 |

(Continued)

OTHER PUBLICATIONS

Chinese Office Action with English Translation of Search Report issued for Application No. 201980061146.8, mailed Feb. 7, 2024.

(Continued)

*Primary Examiner* — Basia A Ridley
*Assistant Examiner* — Jonathan William Estes
(74) *Attorney, Agent, or Firm* — Barnes & Thornburg LLP

(57) ABSTRACT

A negative electrode active material for a rechargeable battery of the present invention includes a silicon composite composed of a silicon compound and at least one carbon material of graphite, non-graphitizable carbon, and soft carbon, a self-assembled monolayer which covers the surface of the silicon composite and has amino groups, and a carbon compound that is bonded to the self-assembled monolayer via the amino groups and contains carbon atoms as a main component.

8 Claims, 12 Drawing Sheets

(56) References Cited

U.S. PATENT DOCUMENTS

2017/0012278 A1* 1/2017 Verma ............... H01M 4/364
2018/0083268 A1 3/2018 Huang
2018/0159135 A1 6/2018 Ito et al.

FOREIGN PATENT DOCUMENTS

| CN | 105226253 A | 1/2016 |
|----|-------------|--------|
| JP | 2011-049046 | 3/2011 |
| JP | 2014-070008 | 4/2014 |
| JP | 2016-526264 | 9/2016 |
| KR | 1020160089858 A | 7/2016 |
| KR | 1020170033123 A | 3/2017 |
| WO | WO2014/189923 | 11/2014 |
| WO | WO2016/181890 | 11/2016 |

OTHER PUBLICATIONS

Korean Office Action with English Translation issued for 10-2021-7007558, mailed Feb. 19, 2024.
PCT Search Report and Written Opinion prepared for PCT/JP2019/045770, completed Feb. 4, 2020.
T. Hirose et al., Solid State Ionics 303 (2017), pp. 154-160.
T. Hirose et al., Solid State Ionics 304 (2017), pp. 1-6.
T. Hirose et al., Solid State Communications 269 (2018), pp. 39-44.

* cited by examiner

NEGATIVE ELECTRODE ACTIVE MATERIAL FOR RECHARGEABLE BATTERY, METHOD FOR PRODUCING THE SAME, AND RECHARGEABLE BATTERY

CROSS-REFERENCE TO RELATED APPLICATIONS

This application is the U.S. national phase of PCT/JP2019/045770, filed on Nov. 22, 2019, which claims the benefit of Japanese Patent Application Serial Number 2018-219705, filed on Nov. 22, 2018, the entire disclosures of both which are incorporated herein by reference.

TECHNICAL FIELD

The present invention relates to a negative electrode active material for a rechargeable battery, a method for producing the same, and a rechargeable battery.

Priority is claimed on Japanese Patent Application No. 2018-219705, filed Nov. 22, 2018, the content of which is incorporated herein by reference.

BACKGROUND ART

Alloy-based materials such as silicon have been focused as new materials that replace graphite, which is a conventional negative electrode material, in order to increase a high energy density of lithium ion batteries (for example, Non Patent Literature 1 to 3). Silicon has a specific capacity that is about four times larger than that of graphite but it is also has large volume expansion when lithium ions are occluded. Therefore, it is known that, when silicon is used as a negative electrode material for a rechargeable battery, capacity deterioration occurs due to crushing of active material particles during charging and discharging cycles of a rechargeable battery and poor contact with a conductivity aid. In addition, it is known that the amount of lithium ions in a positive electrode decreases and the capacity deteriorates due to formation of a coating during an initial charging reaction, and additionally, an activation reaction due to crushing of an active material, and generation of an irreversible capacity due to formation of $Li_4SiO_4$.

CITATION LIST

Patent Literature

Non Patent Literature

[Non Patent Literature 1]
  T. Hirose et al., Solid State Ionics 303 (2017) 154-160
[Non Patent Literature 2]
  T. Hirose et al., Solid State Ionics 304 (2017) 1-6
[Non Patent Literature 3]
  T. Hirose et al., Solid State Communications 269 (2018) 39-44

SUMMARY OF INVENTION

Technical Problem

The present invention has been made in view of the above circumstances, and an object of the present invention is to provide a negative electrode active material for a rechargeable battery which can increase a specific capacity, prevent formation of a coating during an initial charging reaction, and minimize capacity deterioration due to crushing and poor contact with a conductivity aid.

Solution to Problem

In order to address the above problems, the present invention provides the following aspects.

(1) A negative electrode active material for a rechargeable battery according to an aspect of the present invention, including
  a silicon composite composed of a silicon compound and at least one carbon material of graphite, non-graphitizable carbon, and soft carbon;
  a self-assembled monolayer which covers the surface of the silicon composite and has amino groups; and
  a carbon compound that is bonded to the self-assembled monolayer via the amino groups and contains carbon atoms as a main component.
(2) In the negative electrode active material for a rechargeable battery according to (1), preferably, the silicon compound occupies 5% or more of the volume of the silicon composite.
(3) In the negative electrode active material for a rechargeable battery according to (1) or (2), preferably, at least one of Si, SiO, and $SiO_x$ (x is a real number) is contained as the silicon compound in the silicon composite.
(4) In the negative electrode active material for a rechargeable battery according to any one of (1) to (3), the carbon compound may be a carbon nanotube.
(5) In the negative electrode active material for a rechargeable battery according to any one of (1) to (3), the carbon compound may be a polyimide.
6) In the negative electrode active material for a rechargeable battery according to any one of (1) to (3), the carbon compound may be composed of at least one of polyvinylidene fluoride, polytetrafluoroethylene, ethylene-propylene-diene copolymers, styrene-butadiene rubber, acrylonitrile-butadiene rubber, carboxymethyl cellulose, and fluororubber.
(7) A rechargeable battery according to one aspect of the present invention includes the negative electrode active material according to any one of (1) to (6).
(8) A method for producing a negative electrode active material for a rechargeable battery according to an aspect of the present invention is a method for producing the negative electrode active material for a rechargeable battery according to any one of (1) to (6) includes a process of forming a carbon compound having carboxylic groups; a process of forming a silicon composite having amino groups; and a process of mixing the carbon compound and the silicon composite in a liquid and bonding the carboxylic groups and the amino groups.
(9) In the method for producing the negative electrode active material for a rechargeable battery according to (8), preferably, a condensing agent is added to the liquid.
(10) In the method for producing the negative electrode active material for a rechargeable battery according to (8) or (9), preferably, 1-ethyl-3-(3-dimethylaminopropyl) carbodiimide hydrochloride is used as the condensing agent.

Advantageous Effects of Invention

According to the present invention, it is possible to provide a negative electrode active material for a rechargeable battery which can increase a specific capacity, prevent formation of a coating during an initial charging reaction, and minimize capacity deterioration due to crushing and poor contact with a conductivity aid.

DESCRIPTION OF EMBODIMENTS

Figure 1:
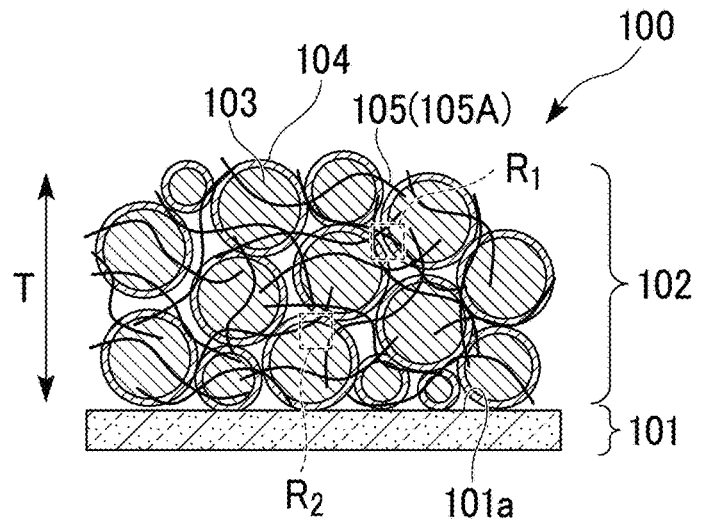
FIG. 1(a) is an enlarged cross-sectional surface view of a negative electrode for a rechargeable battery according to one embodiment of the present invention.
FIGS. 1(b) and 1(c) are enlarged cross-sectional views of a part of a negative electrode active material for a rechargeable battery of FIG. 1(a).
Figure 1:
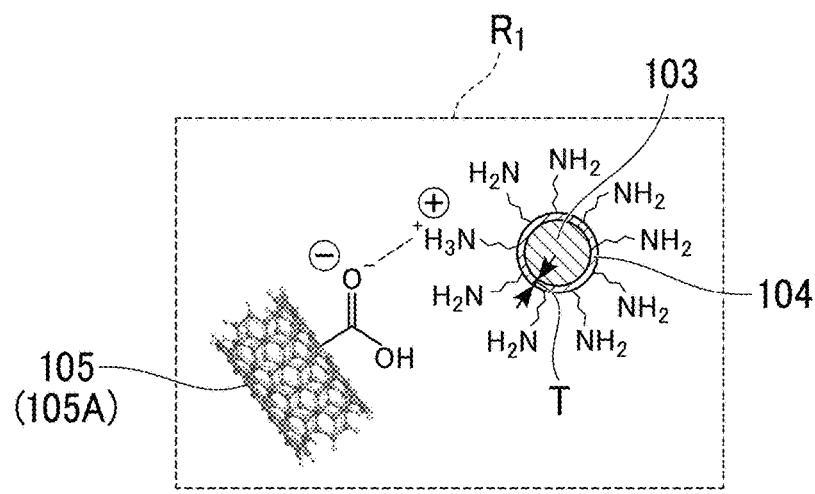
Figure 1:
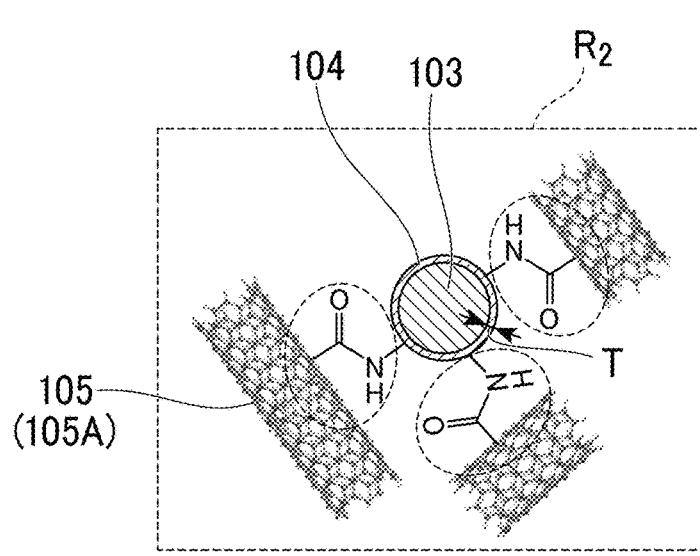

Hereinafter, a negative electrode active material for a rechargeable battery, a method for producing the same, and a rechargeable battery according to embodiments to which the present invention is applied will be described in detail with reference to the drawings. In the drawings used in the following description, in order to facilitate understanding of features, characteristic parts are enlarged for convenience of illustration in some cases, and dimensional proportions and the like of components are not necessarily the same as those of actual components. In addition, materials, sizes, and the like exemplified in the following description are examples, and the present invention is not limited thereto but can be appropriately changed and implemented within ranges in which the scope and spirit of the invention are not changed.

FIG. 1(a) is a cross-sectional view schematically showing a part of a configuration of a negative electrode for a rechargeable battery 100 including a negative electrode active material for a rechargeable battery 102 according to one embodiment of the present invention. In the negative electrode for a rechargeable battery 100, the negative electrode active material for a rechargeable battery 102 is deposited (coated) on one surface 101a of a current collector 101 made of a conductive member such as a copper foil so that a film is formed, and a conductivity aid, a binder (binding agent) and the like are filled into gaps between the negative electrode active materials for a rechargeable battery 102.

The negative electrode active material for a rechargeable battery 102 includes a silicon composite 103 composed of a silicon compound and at least one carbon material of graphite, non-graphitizable carbon (hard carbon), and soft carbon, a self-assembled monolayer 104 which covers the surface of the silicon composite 103, and a carbon compound 105 bonded to the self-assembled monolayer 104.

The silicon composite 103 contains, as a silicon compound, for example, at least one of Si, SiO, and $SiO_x$ (x is a real number). The silicon composite 103 may further contain Sn.

In order to obtain the effect of increasing a specific capacity, the silicon compound preferably occupies 5% or more of the volume of the silicon composite 103. The average size of the silicon compound (the average size of particle sizes of particles of the silicon compound measured in all directions) is preferably 10 nm or more and 15,000 nm or less.

Regarding the silicon compound, for example, composite particles obtained by dispersing nano silicon particles with a particle size of about 100 nm in hollow soft carbon with a particle size of about 10 nm can be used.

In this case, the volume ratio of nano silicon and soft carbon is preferably 50:50. In addition, regarding the silicon compound, for example, silicon oxide ($SiO_x$) particles with a particle size of about 10,000 nm and silicon oxide (SiO) primary particles with a particle size of about 1,000 nm can be used.

The self-assembled monolayer 104 is a film composed of molecules such as carbon, which has a surface on which amino groups ($-NH_2$) are formed. The thickness T of the self-assembled monolayer 104 is preferably 1 nm or more and 10 nm or less. In the present embodiment, a case in which N-[(triethoxysilyl)methyl]-1,6-hexanediamine (AHAMTES) is used as the self-assembled monolayer 104 will be exemplified.

The carbon compound 105 is a structure of molecules containing carbon atoms as a main component, and examples thereof include conductive materials such as carbon nanotubes (preferably, multi-walled carbon nanotubes of which the length and thickness are not limited), graphene, reduced graphene oxide, acetylene black, amorphous carbon, and conductive polymers, and binding agents such as polyimide and carboxymethyl cellulose. In the present embodiment, a case in which a carbon nanotube 105A is used as the carbon compound 105 will be exemplified.

FIG. 1(b) is a diagram of an enlarged region $R_1$ in the negative electrode active material for a rechargeable battery 102 in FIG. 1(a). As shown in FIG. 1(b), the negative electrode active material for a rechargeable battery 102 has a part in which the monolayer 104 of the organic silane compound and the carbon nanotube 105A are non-covalently bonded. In this part, more specifically, positively charged functional groups ($-NH_3^+$) among amino groups formed on the self-assembled monolayer 104 and carboxylic groups formed on the carbon nanotube 105A are non-covalently bonded by an attractive force associated with an electrostatic interaction.

FIG. 1(c) is a diagram of an enlarged region $R_2$ in the negative electrode active material for a rechargeable battery 102 in FIG. 1(a). As shown in FIG. 1(c), the negative electrode active material for a rechargeable battery 102 has a part in which a plurality of carbon nanotubes 105A are bonded to a monolayer 104 of the silicon compound via amino groups. In this part, more specifically, carboxylic groups ($-COOH$) formed on the surface of the carbon nanotube 105A are amide-bonded (parts surrounded by dashed lines) to amino groups formed on the surface of the self-assembled monolayer 104.

Examples of binders include polyvinylidene fluoride (PVDF), polytetrafluoroethylene (PTFE), ethylene-propylene-diene copolymer (EPDM), styrene-butadiene rubber (SBR), acrylonitrile-butadiene rubber (NBR), polyimide (PI), carboxymethyl cellulose (CMC), and fluororubber.

Examples of conductivity aids include ketjen black, acetylene black, carbon black, graphite, carbon nanotubes, carbon fibers, graphene, amorphous carbon, conductive polymer polyaniline, polypyrrole, polythiophene, polyacetylene, and polyacene.

Figure 2:
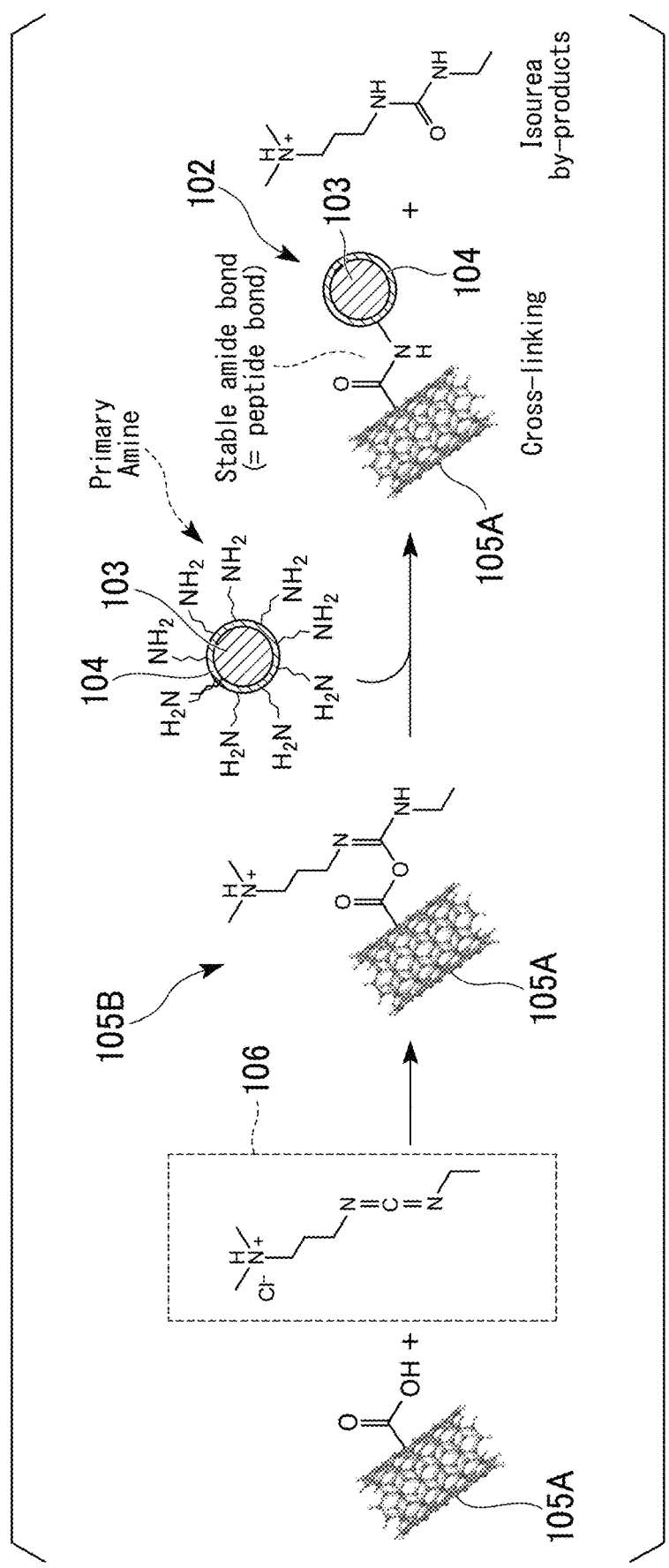
FIG. 2 is a diagram illustrating details of a process of producing a negative electrode active material for a rechargeable battery according to one embodiment of the present invention.

FIG. 2 is a diagram schematically illustrating a process of producing a negative electrode active material for a rechargeable battery 102 according to the present embodiment.

First, a carbon nanotube 105A having carboxylic groups ($-COOH$) formed on its surface is prepared, a condensing agent such as EDC (1-ethyl-3-(3-dimethylaminopropyl) carbodiimide hydrochloride) 106 is added thereto, and an active ester compound 105B of the carbon nanotube 105A is synthesized.

Next, the synthesized active ester compound 105B is reacted with a separately synthesized silicon composite 103 having amino groups ($-NH_2$), and thus the carbon nanotube 105A and the silicon composite 103 are amide-bonded to obtain the negative electrode active material for a rechargeable battery 102.

Here, the silicon composite 103 having amino groups can be synthesized according to either a dry process or a wet process. However, a composite synthesized in the wet process is more effective because it is easier to control equilibrium between an adsorption reaction of carbon nanotubes with respect to the surface of silicon composite particles and a self-assembly reaction of carbon nanotubes between silicon composite particles. Therefore, the bond between the amino group of the silicon composite 103 and the carboxylic group of the carbon nanotube 105A becomes strong, and it is possible to prevent peeling off of a conductivity aid due to volume expansion of silicon and prevent crushing of the active material itself and the like. As a result, compared to when a composite is synthesized in the dry process, it is possible to maintain a high discharging capacity in the cycle test.

Figure 3:
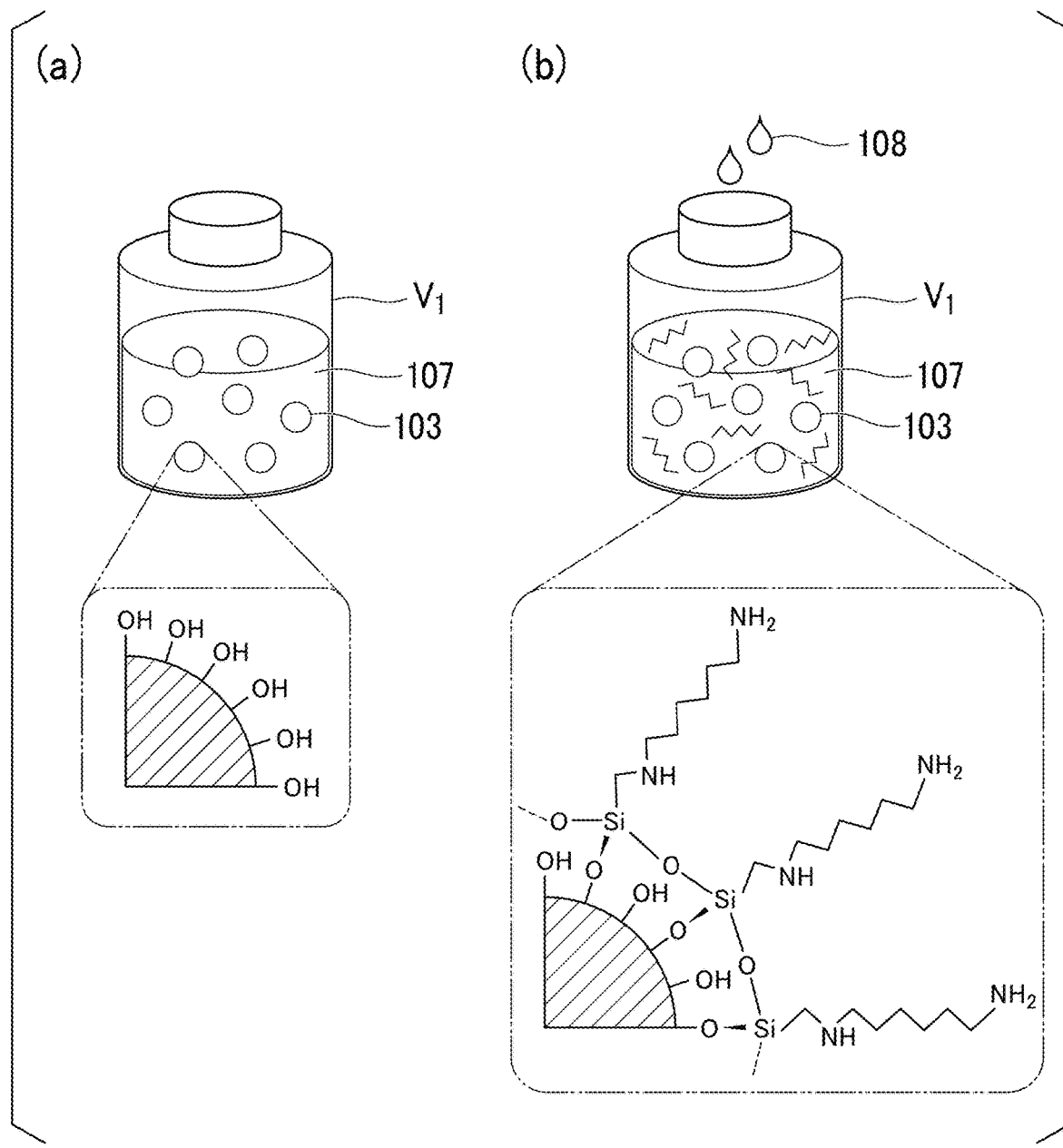
FIGS. 3(a) and 3(b) are diagrams schematically illustrating one method of forming a monolayer on a silicon composite.

FIGS. 3(a) and 3(b) are diagrams schematically illustrating a wet process for synthesizing a silicon composite 103B having amino groups.

First, as shown in FIG. 3(a), a mixed solution L1 containing a silicon composite 103A having hydroxy groups ($-OH$) and carboxylic groups ($-COOH$) formed on its surface is prepared by mixing 1 g of a silicon composite with at room temperature with 60 mL of ethanol 107 contained in a container $V_1$.

Subsequently, as shown in FIG. 3(b), 20 μL or more and 70 μL or less of amino organic silane 108 is added to the container $V_1$ and left overnight at room temperature. Therefore, a mixed solution $L_2$ containing the silicon composite 103 in which amino groups ($-NH_2$) are additionally formed via silicon on hydroxy groups formed on a surface layer part (the self-assembled monolayer 104) of the silicon composite 103A can be obtained.

Here, when EDC is not used, carboxylic groups of the carbon nanotube 105A and functional groups ($-NH_3^+$) positively charged with amino groups of the silicon composite 103 are non-covalently bonded by an attractive force associated with the electrostatic interaction. In this case, the bond strength is lower than that of the amide bond (covalent bond), but a predetermined effect can be obtained by covering the carbon nanotube 105A with the silicon composite 103. Therefore, it is not necessary to use EDC in order to obtain the effect of the present embodiment.

As described above, since the negative electrode active material for a rechargeable battery 102 according to the present embodiment contains silicon, the specific capacity can be about four times larger than that of a conventional negative electrode active material made of graphite. In addition, since the carbon compound covers the periphery of silicon, it is possible to prevent formation of a coating during an initial charging reaction and minimize volume expansion of silicon, and it is possible to avoid problems specific to a silicon-based active material such as peeling off of a conductivity aid due to volume expansion and crushing of the active material itself. Therefore, when the negative electrode active material for a rechargeable battery 102 is used for a rechargeable battery for a long time, the reliability can be greatly improved (in this case, in the rechargeable battery, the configuration other than the negative electrode, that is, the configuration such as a positive electrode, an electrolytic solution, a separator, and a case is not limited). In addition, when some of active material particles contain silicon that expands violently in volume, since gaps between active material particles are reduced, it is possible to reduce the amount of an insulating binder that fills the gaps.

EXAMPLES

Hereinafter, the effects of the present invention will be more clearly understood with reference to examples. Here, the present invention is not limited to the following examples, and can be appropriately changed and implemented without changing the gist of the invention.

Negative electrode active materials for a rechargeable battery were produced as Examples 1 to 4 of the present invention and Comparative Examples 1 to 3 under different conditions. Table 1 shows the mixing ratio of the silicon composite 103, the self-assembled monolayer 104, the multi-walled carbon nanotube (MWCNT) 105A and the like contained in the negative electrode active material for a rechargeable battery 102 produced under respective conditions.

TABLE 1

| | Composition | AHAMTES (μL) | Active material Si/C (wt %) | Conductive material MWCNT in H$_2$O (wt %) | Binder |
|---|---|---|---|---|---|
| Example 1 | MWCNT/NH$_2$—Si/C | 50 | 90 | 10 | — |
| Example 2 | MWCNT/EDC/NH$_2$—Si/C | 50 | 90 | 10 | — |
| Example 3 | MWCNT/NH$_2$—Si/C | 50 | 90 | 10 | — |
| Example 4 | MWCNT/EDC/NH$_2$—Si/C | 200 | 90 | 10 | — |
| Comparative Example 1 | NH$_2$—Si/C | 50 | 100 | — | — |
| Comparative Example 2 | MWCNT/Si/C | 0 | 90 | 10 | — |
| Comparative Example 3 | Si/C/AB/PVDF | 0 | 80 | 10 wt % (AB) | 10 wt % (PVDF) |

Example 1

A negative electrode including a negative electrode active material for a rechargeable battery as Example 1 was produced according to the following procedure (processes 1 to 5). FIGS. 4(a) to 4(d) are diagrams schematically showing respective procedures.

[Process 1]

Figure 4:
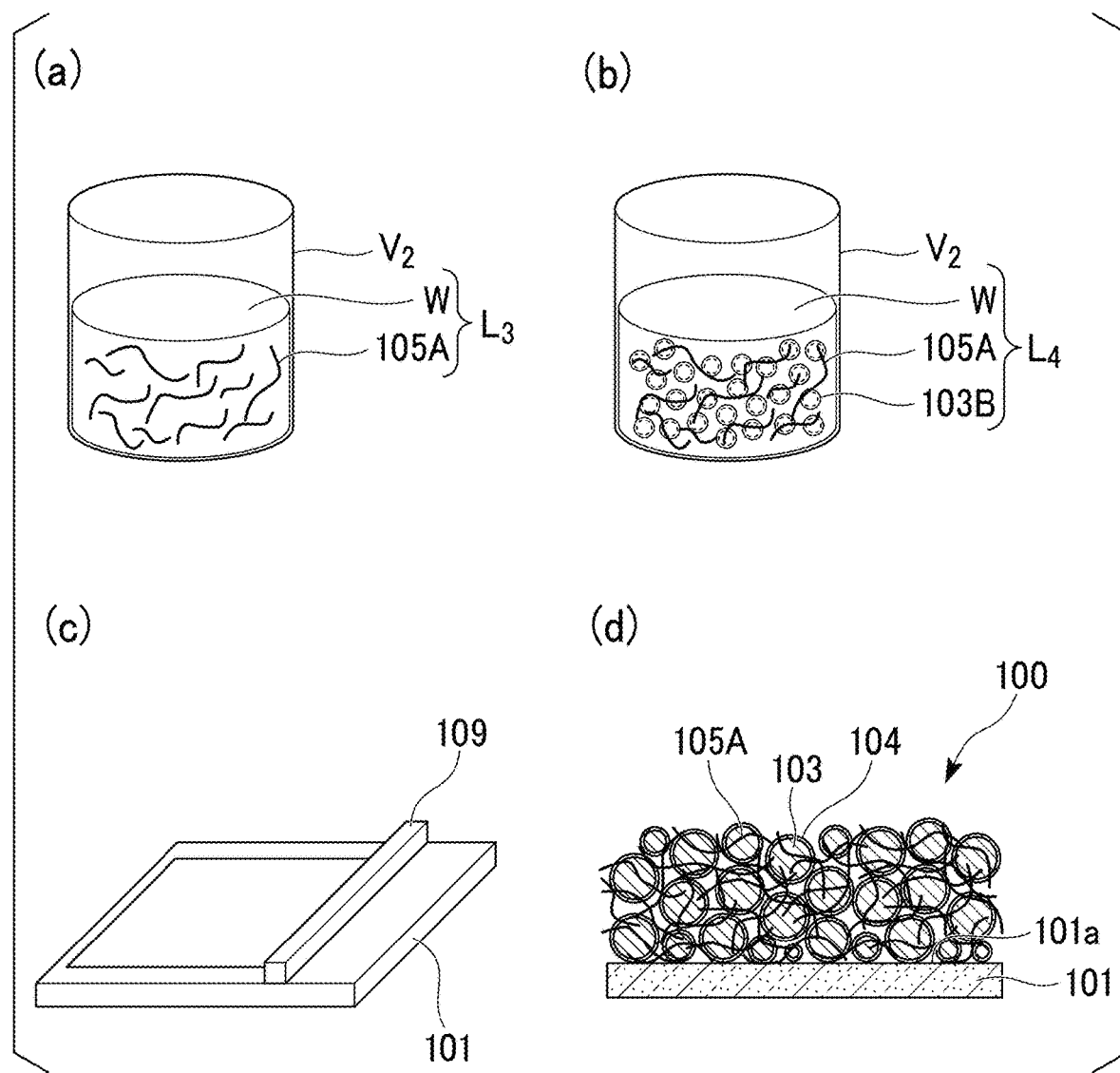
FIGS. 4(a) to 4(d) are diagrams schematically illustrating a process of producing a negative electrode active material for a rechargeable battery according to one embodiment of the present invention.

First, as shown in FIG. 4(a), a mixed solution L$_3$ containing the multi-walled carbon nanotube 105A having carboxylic groups (—COOH) formed on its surface was prepared by mixing 9 wt % of the multi-walled carbon nanotube (MWCNT) 105A at room temperature with water (H$_2$O) contained in the container V$_2$. A nanotube having a length of 500 to 700 nm, a diameter of 15 to 20 nm, and 15 to 18 layers was used as the multi-walled carbon nanotube 105A.

[Process 2]

In addition, a mixed solution L$_3$ containing the silicon composite 103A having hydroxy groups (—OH) formed on its surface was prepared by mixing the silicon composite 103 containing 33% of nano silicon (n-Si) 104 and 67% of graphite at a weight ratio at room temperature with ethanol contained in another container. Subsequently, 50 μL of amino organic silane was added to the same container and left overnight at room temperature, and thereby a mixed solution L$_4$ containing the silicon composite 103B in which amino groups (—NH$_2$) were formed via silicon on hydroxy groups formed on the silicon composite 103A was prepared.

[Process 3]

Next, as shown in FIG. 4(b), the mixed solution L$_3$ prepared in the process 1 was mixed with the silicon composite 103B prepared in the process 2 at room temperature, and thereby a mixed solution L$_5$ containing water W, the multi-walled carbon nanotube 105A, and the silicon composite 103B was prepared. The weight ratio of the multi-walled carbon nanotube 105A and the silicon composite 103 in the mixed solution L$_5$ was adjusted to be 1:9.

[Process 4]

Next, as shown in FIG. 4(c), a prepared mixed solution L$_6$ was added dropwise to the current collector 101 made of a conductive member, and blade coating was performed using a pressing member 109.

Subsequently, water contained in the coated mixed solution L$_6$ was removed by vacuum drying at 80° C., and as shown in FIG. 4(d), the negative electrode for a rechargeable battery 100 in which the negative electrode active material for a rechargeable battery 102 according to the present embodiment was formed on the current collector 101 was obtained. The obtained negative electrode active material for a rechargeable battery 102 was laminated (deposited) on one surface 101a of the current collector when a plurality of granular silicon composites 103 containing nano silicon were non-covalently bonded via the self-assembled monolayer 104 covering the surface due to an attractive force associated with the electrostatic interaction with the carbon nanotube 105A.

Example 2

A negative electrode including a negative electrode active material for a rechargeable battery as Example 2 was produced by changing only the procedure of the process 1 in Example 1. That is, in the process 1, multi-walled carbon nanotubes and 1.5 mg of powder EDC were mixed with water contained in the container to prepare a mixed solution L$_7$. The procedures of the other processes were the same as in Example 1.

Example 3

A negative electrode including a negative electrode active material for a rechargeable battery as Example 3 was produced according to the same procedures as in Example 1. However, the amount of organic silane mixed was 200 μL.

Example 4

A negative electrode including a negative electrode active material for a rechargeable battery as Example 4 was produced in the same procedures as in Example 2. However, the amount of organic silane mixed was 200 μL.

Comparative Example 1

A negative electrode including a negative electrode active material for a rechargeable battery as Comparative Example 1 was produced according to the only the procedure of the processes 2 and 4. That is, a mixed solution to be applied to a current collector was prepared without mixing the multi-walled carbon nanotube 105A. Therefore, the self-assembled monolayer having amino groups was exposed.

Comparative Example 2

A negative electrode including a negative electrode active material for a rechargeable battery as Comparative Example 2 was produced according to the procedure (the procedure of the processes 1, 3, and 4) without the process 2. That is, in the process 3, the silicon composite 103A having no amino groups was mixed with the mixed solution $L_1$ obtained in the process 1 at room temperature.

Comparative Example 3

For a negative electrode including a negative electrode active material for a rechargeable battery as Comparative Example 3, nano silicon (n-Si) that was not subjected to the processes 1 to 3 was used, a mixed NMP solution $L_8$ in which the silicon composite 103 containing 33% of nano silicon and 67% of graphite at a weight ratio and acetylene black, and polyvinylidene fluoride were mixed at a weight ratio of 80:10:10 was prepared, and this was applied to a current collector using the same manners as in the process 4, and water was removed.

Figure 5:
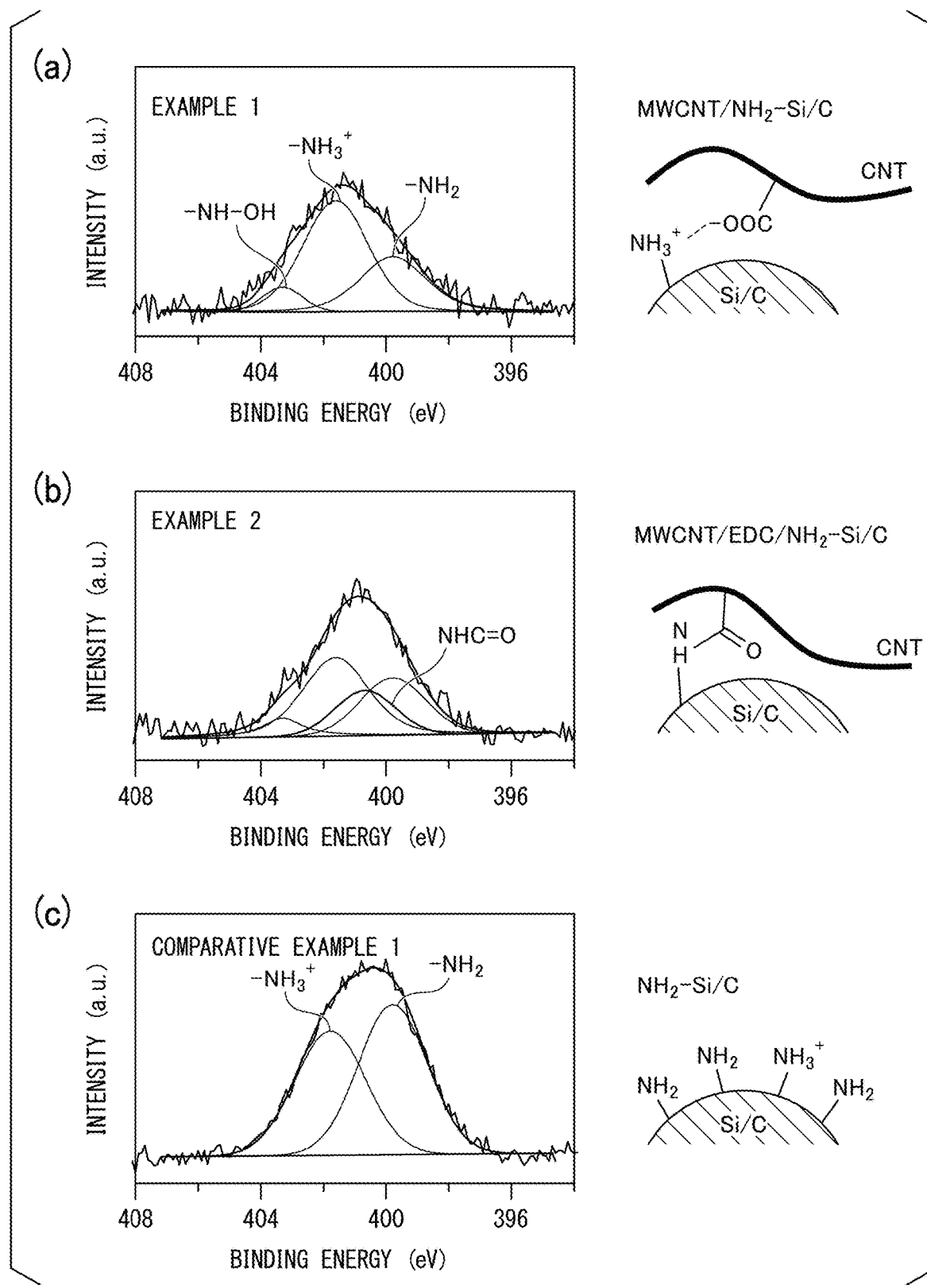
FIGS. 5(a) to 5(c) are graphs showing XPS analysis results of negative electrode active materials for a rechargeable battery of Examples 1 and 2 of the present invention and Comparative Example 1.
Figure 6:
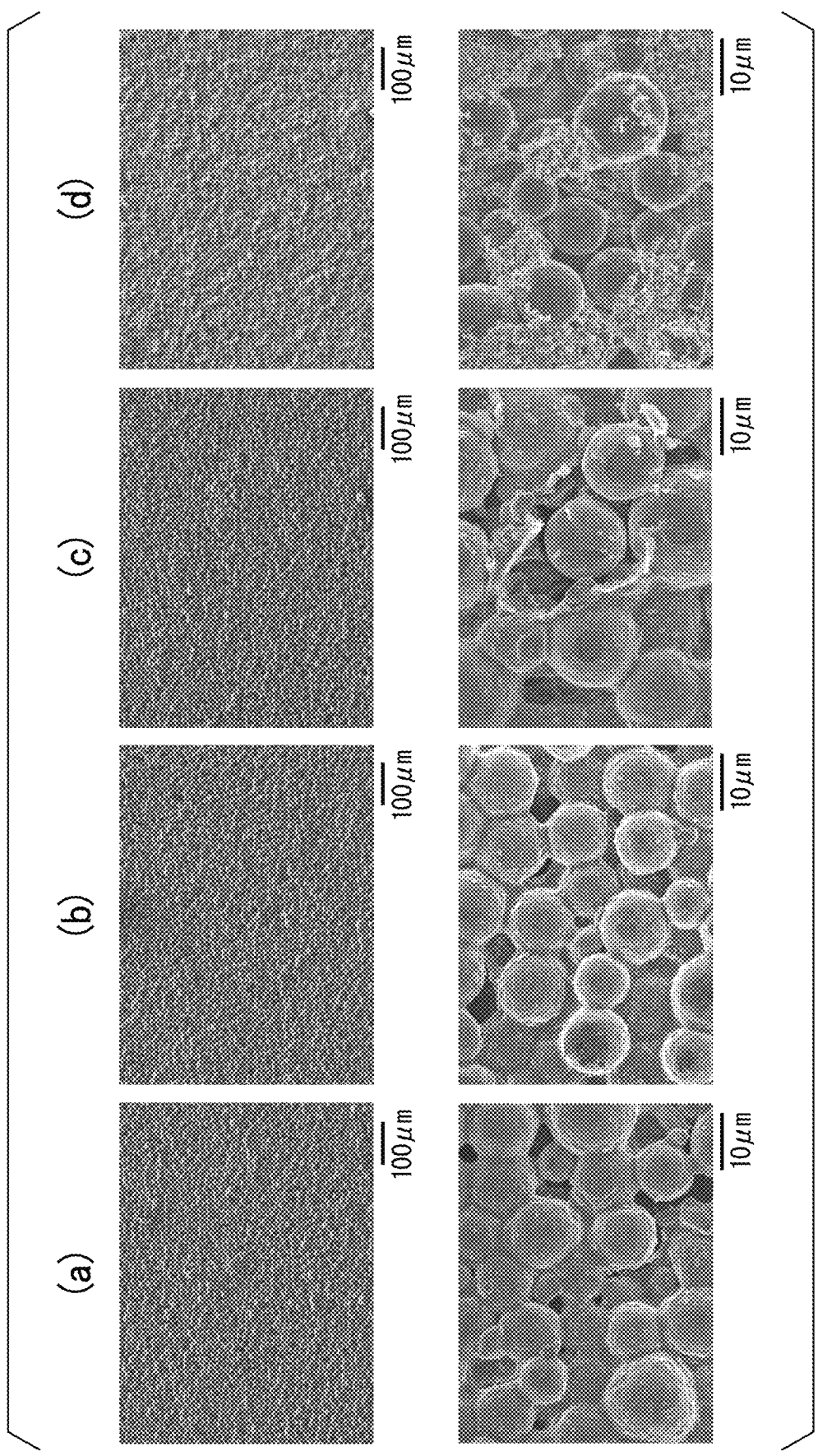
FIGS. 6(a) to 6(d) are SEM images of negative electrode active materials for a rechargeable battery of Examples 2 and 4 of the present invention and Comparative Examples 2 and 3.
Figure 7:
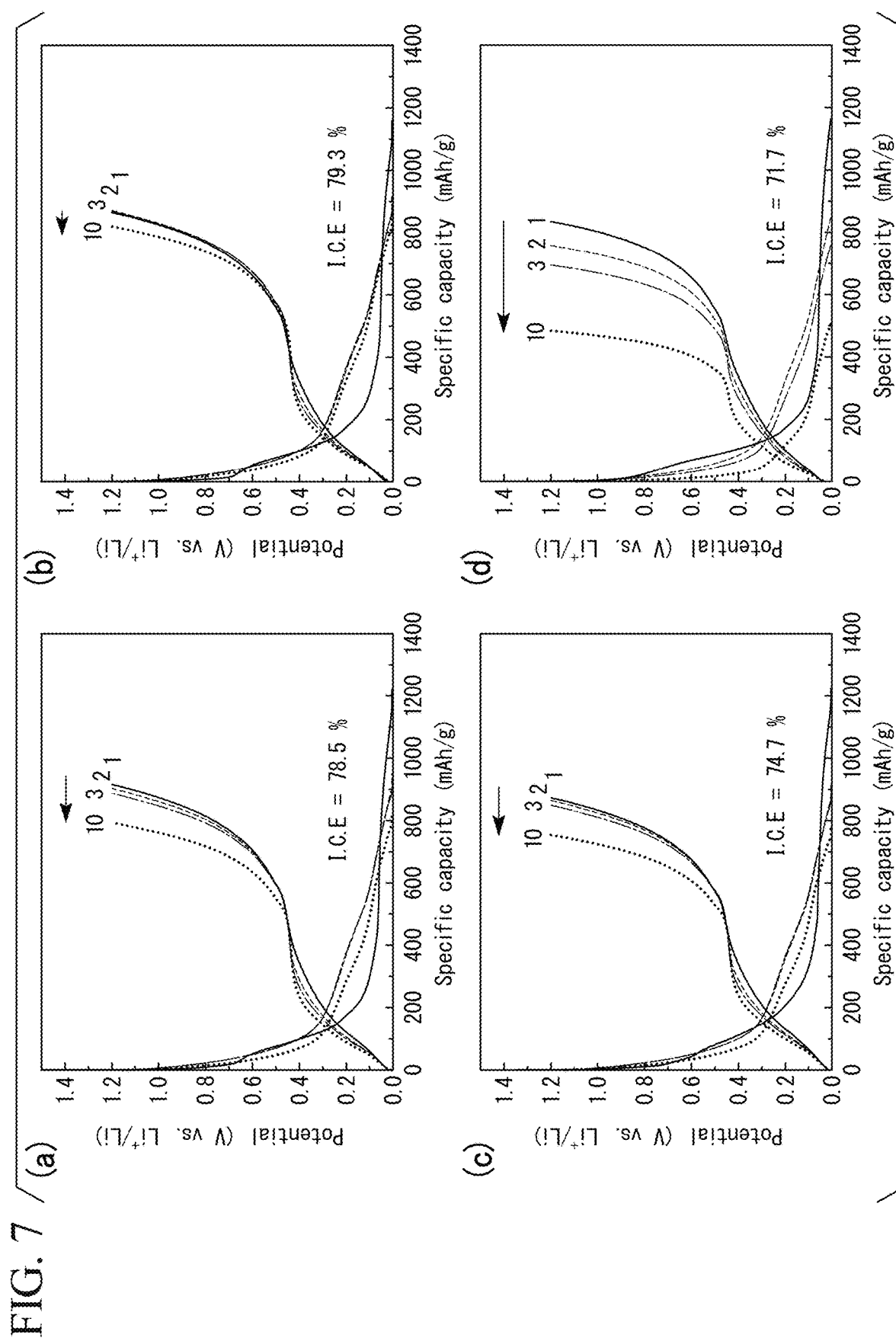
FIGS. 7(a) to 7(d) are graphs showing test results of constant current charging and discharging characteristics for R2032 coin type half cells using the negative electrode active materials for a rechargeable battery of Examples 2 and 4 of the present invention and Comparative Examples 2 and 3.

The surface states of substances of the negative electrodes for a rechargeable battery obtained in Examples 1 and 2 and Comparative Example 1 were measured through XPSN1s core level spectrums. FIGS. 5(a) to 5(c) are graphs showing the analysis results of Examples 1 and 2, and Comparative Example 1. In the graphs, the horizontal axis represents the binding energy (eV) of molecules, and the vertical axis represents spectral intensity (a.u.). Table 2 shows the relative area ratio obtained by separating waveforms of spectrums.

TABLE 2

| Chemical species | Relative peak area ratio [%] | | |
|---|---|---|---|
| | Comparative Example 1 | Example 1 | Example 2 |
| —$NH_2$ | 66.3% | 32.3% | 27.9% |
| —$NH_3^+$ | 33.7% | 55.9% | 43.7% |
| NHC=O | — | — | 20.2% |
| —NH—OH | — | 7.8% | 8.2% |

In Example 1, comparing spectral intensities, it was found that the amount of molecules (silicon composite) having functional groups (—$NH_3^{3+}$) positively charged with amino groups was about 1.7 times than that of Comparative Example 1. Accordingly, it was found that most of silicon composites in Example 1 were non-covalently bonded to carboxylic groups of the multi-walled carbon nanotubes due to an attractive force associated with the electrostatic interaction.

On the other hand, in Example 2, it was found that molecules having a covalent bond (amide bond (NHC=O)) with carboxylic groups of the multi-walled carbon nanotubes in addition to the functional groups positively charged with amino groups were also included. This is because EDC mixed with the multi-walled carbon nanotubes had a function as a condensing agent for forming an amide bond.

FIGS. 6(a) to 6(d) show results of surface SEM observation of the negative electrodes for a rechargeable battery obtained in Examples 2 and 4, and Comparative Examples 2 and 3.

It was found that the surface of the silicon composite particles in Example 2 was covered with the multi-walled carbon nanotubes, and additionally the multi-walled carbon nanotubes were self-assembled between the silicon composite particles in a bundle shape to crosslink the particles. Therefore, it was found that the silicon composite particles were non-covalently bonded to carboxylic groups of the multi-walled carbon nanotubes due to an attractive force associated with the electrostatic interaction.

It was found that the surface of the silicon composite particles in Example 4 was more uniformly covered with the multi-walled carbon nanotubes compared to Example 2. In addition, it was found that adjacent silicon composite particles were connected by the multi-walled carbon nanotubes while maintaining original spherical shapes of individual silicon composite particles. It was found that formation of amide bonds (NHC=O) effectively acted on compositing of silicon composite particles and multi-walled carbon nanotubes.

On the other hand, in the silicon composite particles in Comparative Example 2, peeling off of the multi-walled carbon nanotubes adhered to the surface of the silicon composite particles was observed. It was found that physical adsorption alone in which there was no action of chemically bonding the surface of silicon composite particles and multi-walled carbon nanotubes was not sufficient for compositing the silicon composite particles and the multi-walled carbon nanotubes.

An initial characteristic test of constant current charging and discharging characteristics was performed on R2032 coin type half cells including the electrodes made of negative electrode active materials for a rechargeable battery of Examples 2 and 4, and Comparative Examples 2 and 3 and a counter electrode made of a Li metal.

The weight per unit area of the electrode was adjusted to about 0.5 mg/cm$^2$ per Si and the film thickness was adjusted to about 20 μm, and evaluation was performed without pressing. EC-DMC containing 1 M $LiPF_6$ was used as the electrolytic solution. #2400 (commercially available from Celgard LLC) was used as the separator. A charging and discharging test was repeated 10 times under conditions of a cutoff voltage range of 0.05 to 1.2 V($Li^+$/Li), a current density of 100 mA/g, and room temperature. In this case, the charging and discharging reaction was performed in a CCCV mode, and the discharging reaction was performed in a CC mode. FIGS. 7(a) to 7(d) are graphs showing the test results of constant current charging and discharging characteristics of the R2032 coin type half cells using the negative electrode active materials for a rechargeable battery of Examples 2 and 4, and Comparative Examples 2 and 3. In the graphs, the horizontal axis represents specific capacity (mAh/g) in terms of silicon. Table 3 shows the Coulomb efficiency in the initial charging and discharging reaction in respective cases.

TABLE 3

| | Composition | Specific capacity (mAh/g) | | Initial Coulomb efficiency I.C.E (%) |
| --- | --- | --- | --- | --- |
| | | Lithiation reaction (discharging reaction) | Delithiation reaction (charging reaction) | |
| Example 2 | MWCNT/NH$_2$—Si/C | 1,050 | 825 | 78.50% |
| Example 4 | MWCNT/EDC/NH$_2$—Si/C | 1,091 | 865 | 79.30% |
| Comparative Example 2 | MWCNT/Si/C | 1,023 | 764 | 74.70% |
| Comparative Example 3 | PVDF/AB/Si/C | 1,164 | 835 | 71.70% |

In the initial charging and discharging reaction, the Coulomb efficiency in Comparative Example 3 was 71.4%, and it rapidly deteriorated (decreased) as the charging and discharging cycle was repeated. On the other hand, in Examples 2 and 4, and Comparative Example 2, the Coulomb efficiency of the silicon composite particle electrode containing carbon nanotubes exhibited a value higher than the above, and the values were Example 4, Example 2, and Comparative Example 2 (Example 4>Example 2>Comparative Example 2) in descending order. In addition, minimization of capacity deterioration resulting from the charging and discharging cycle was strengthened in the same order (Example 4>Example 2>Comparative Example 2).

This is because the surface of the silicon composite particles contained in Examples 2 and 4 was covered with the carbon nanotubes, an electron conduction path in which adjacent particles were connected by the carbon nanotubes was formed, and thus the volume expansion was minimized, and it was possible to reduce peeling off of a conductivity aid due to volume expansion, crushing of the active material itself and the like compared to Comparative Example 3. It was found that the effect of the carbon nanotubes was more effective as the interaction with the silicon composite particles was stronger.

Figure 8:
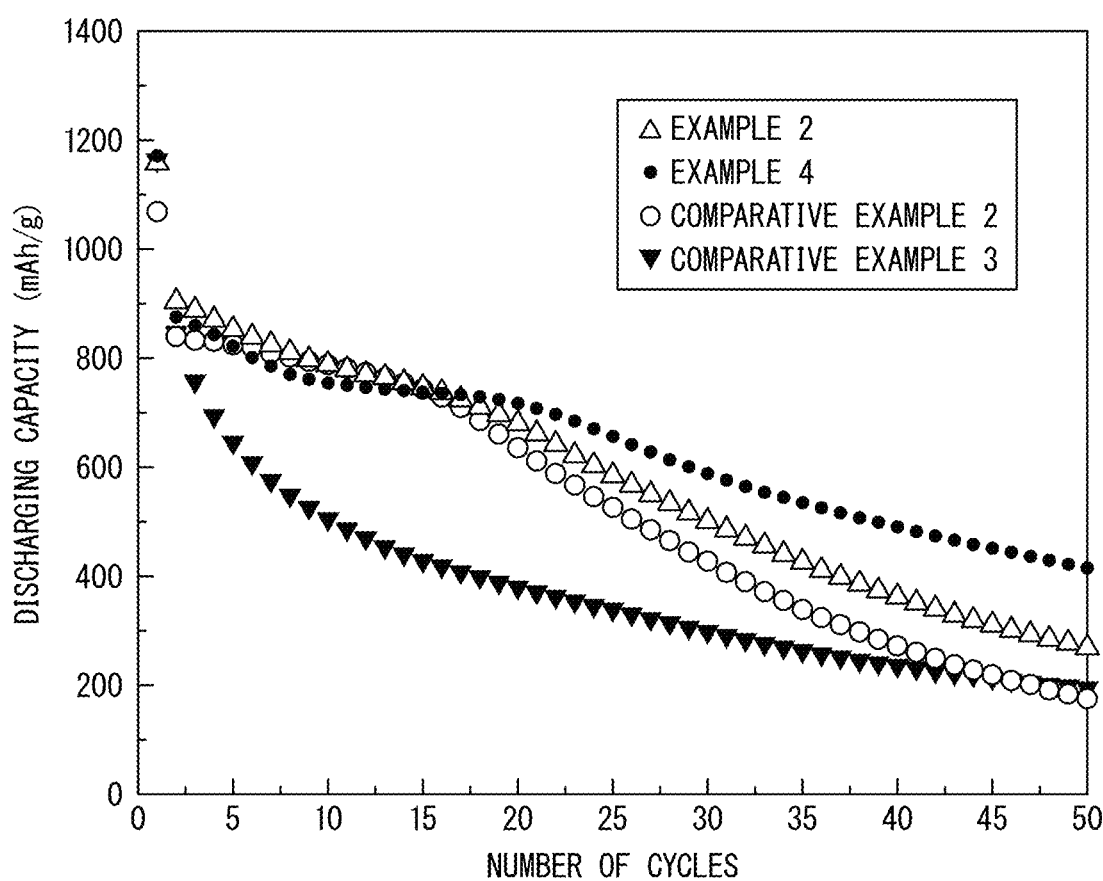
FIG. 8 is a graph showing cycle test results of discharging capacities of R2032 coin type half cells using the negative electrode active materials for a rechargeable battery of Examples 2 and 4 of the present invention and Comparative Examples 2 and 3.

The cycle test was performed on R2032 coin type half cells including the electrodes including the negative electrode active materials for a rechargeable battery obtained in Examples 2 and 4 and Comparative Examples 2 and 3 and a counter electrode made of a Li metal. FIG. 8 is a graph showing the test results. In the graphs, the horizontal axis represents the number of cycles (the number of repetitions of charging and discharging), and the vertical axis represents the discharging capacity (mAh/g).

When the number of cycles was 20 or less, the discharging capacity of Comparative Examples 2 and 3 rapidly deteriorated (decreased) as charging and discharging were repeated, but the discharging capacity of Examples 2 and 4 maintained about 75% or more of the initial value and deterioration was minimized. This is because silicon contained in Examples 2 and 4 was covered with carbon nanotubes, the volume expansion was minimized, and it was possible to reduce peeling off of a conductivity aid due to volume expansion, crushing of the active material itself and the like compared to Comparative Examples 2 and 3.

The discharging capacity of Example 4 was kept a small degree of deterioration at least for the number of cycles of 0 to 50 and maintained a higher value than that of Example 3. This is because, compared to Example 2, the negative electrode active material for a rechargeable battery in Example 4 could form more amide bonds between the silicon composite and the multi-walled carbon nanotubes, and could more strongly protect the surface of silicon contained therein.

On the other hand, in Comparative Example 2, although a large amount of multi-walled carbon nanotubes was contained, they were simply physically adsorbed to the surface of the silicon composite but were not amide-bonded. Therefore, it was not possible to chemically fix the silicon composite, and thus it was not possible to minimize volume expansion of silicon, peeling off of a conductivity aid due to volume expansion, crushing of the active material itself and the like increased, and as a result, the discharging capacity greatly deteriorated from the initial stage.

Figure 9:
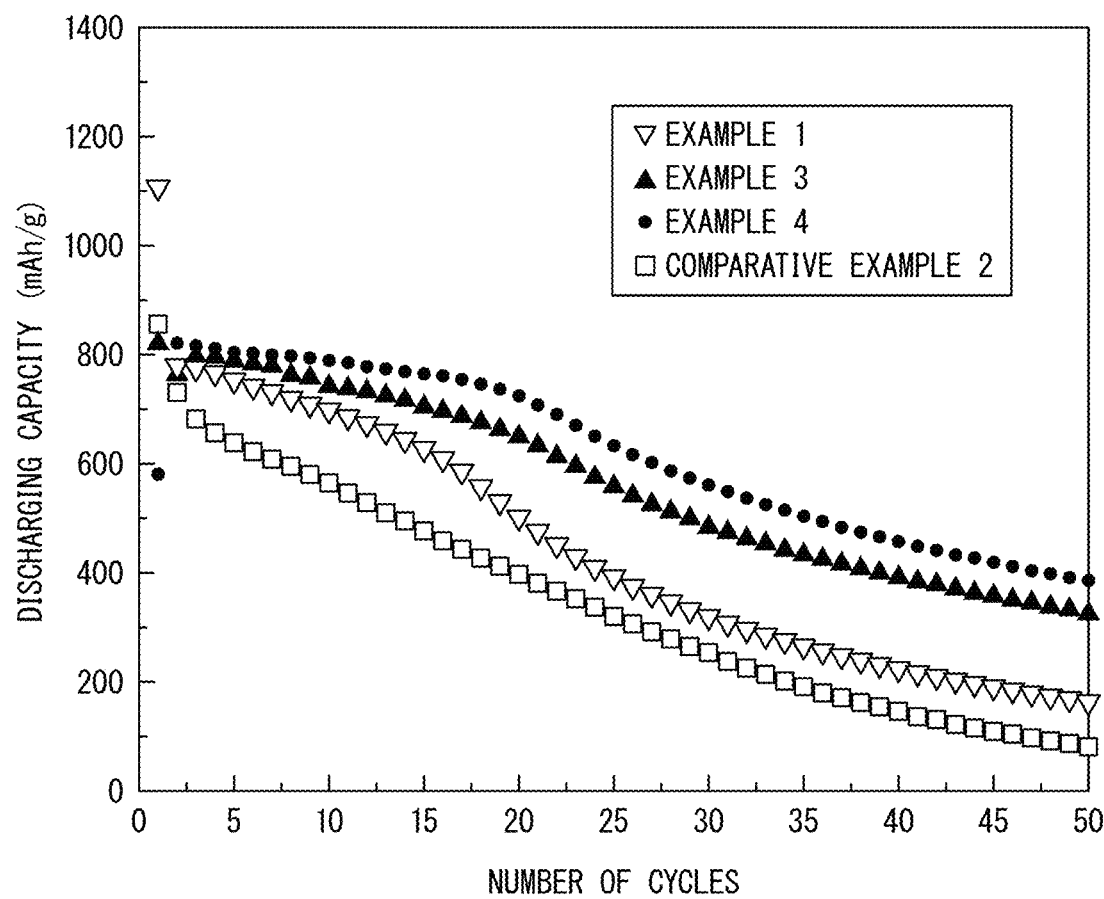
FIG. 9 is a graph showing cycle test results of discharging capacities of R2032 coin type half cells using the negative electrode active materials for a rechargeable battery of Examples 1, 3, and 4 of the present invention and Comparative Example 2.

For discharging characteristics of the negative electrode active materials for a rechargeable battery obtained in Examples 2 and 5, the current density increased to 500 mA/g, and the cycle test was performed in the same method. FIG. 9 is a graph showing the test results. In the graph, the horizontal axis and the vertical axis represent those the same as in FIG. 8.

The discharging capacity in Example 4 was kept a small degree of deterioration at least for the number of cycles of 0 to 50, and maintained a higher value than those of Examples 1 and 3, and Comparative Example 2. In addition, there was no decrease in specific capacity due to the increase in internal resistance resulting from the increase in the current density. This is because EDC used in Example 4 had a stronger effect of promoting formation of amide bonds than those of Examples 1 and 3, volume expansion of silicon was more greatly minimized, and it was possible to greatly reduce peeling off of a conductivity aid due to volume expansion, crushing of the active material itself and the like.

In addition, comparing Examples 1 and 3, Example 3 containing more amino groups on the surface of the silicon composite had a smaller degree of deterioration, and even in non-covalent bonds with an electrostatic attractive force, volume expansion of silicon was minimized to some extent, and it was possible to greatly reduce peeling off of a conductivity aid due to volume expansion, crushing of the active material itself and the like.

Figure 10:
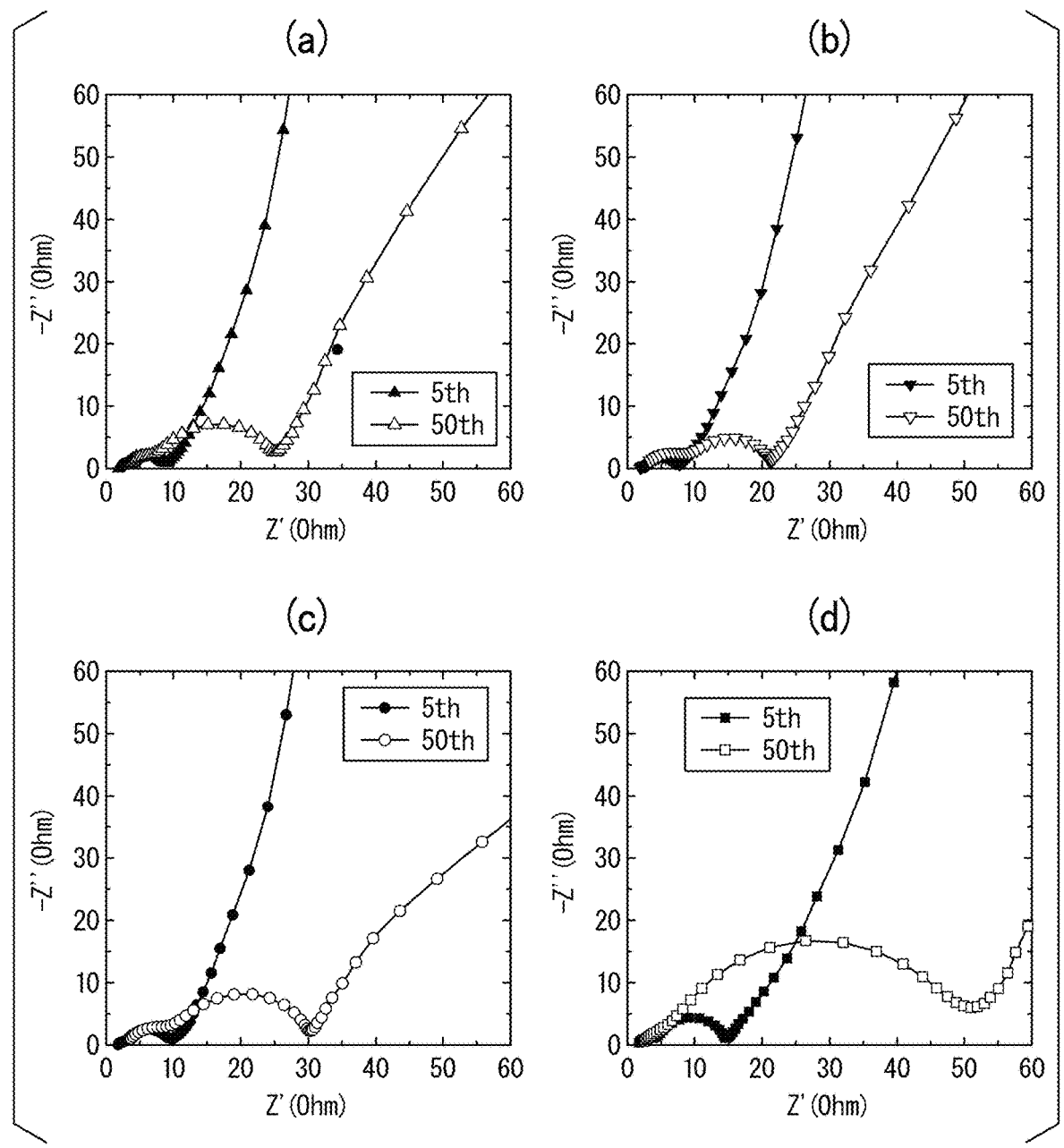
FIGS. 10(a) to 10(d) are graphs of Nyquist plots of results of measurement by an AC impedance method after a cycle test in FIG. 8.
Figure 11:
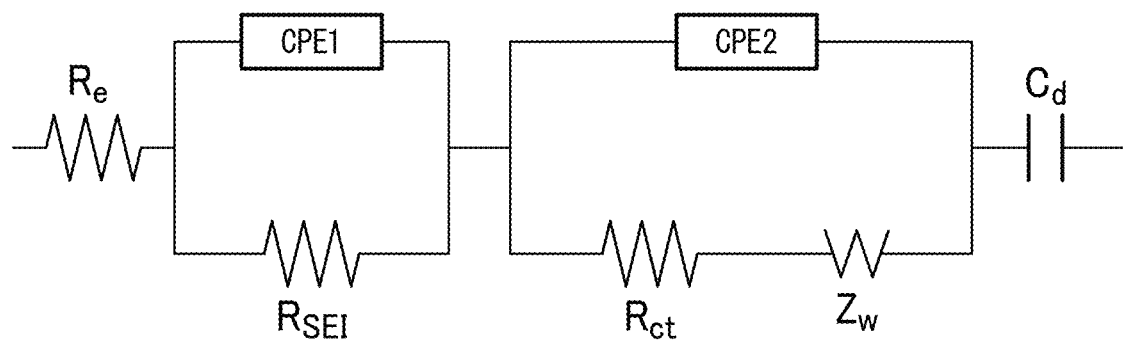
FIG. 11 is a diagram showing an equivalent circuit model for a circuit used for measurement in FIG. 10.
Figure 12:
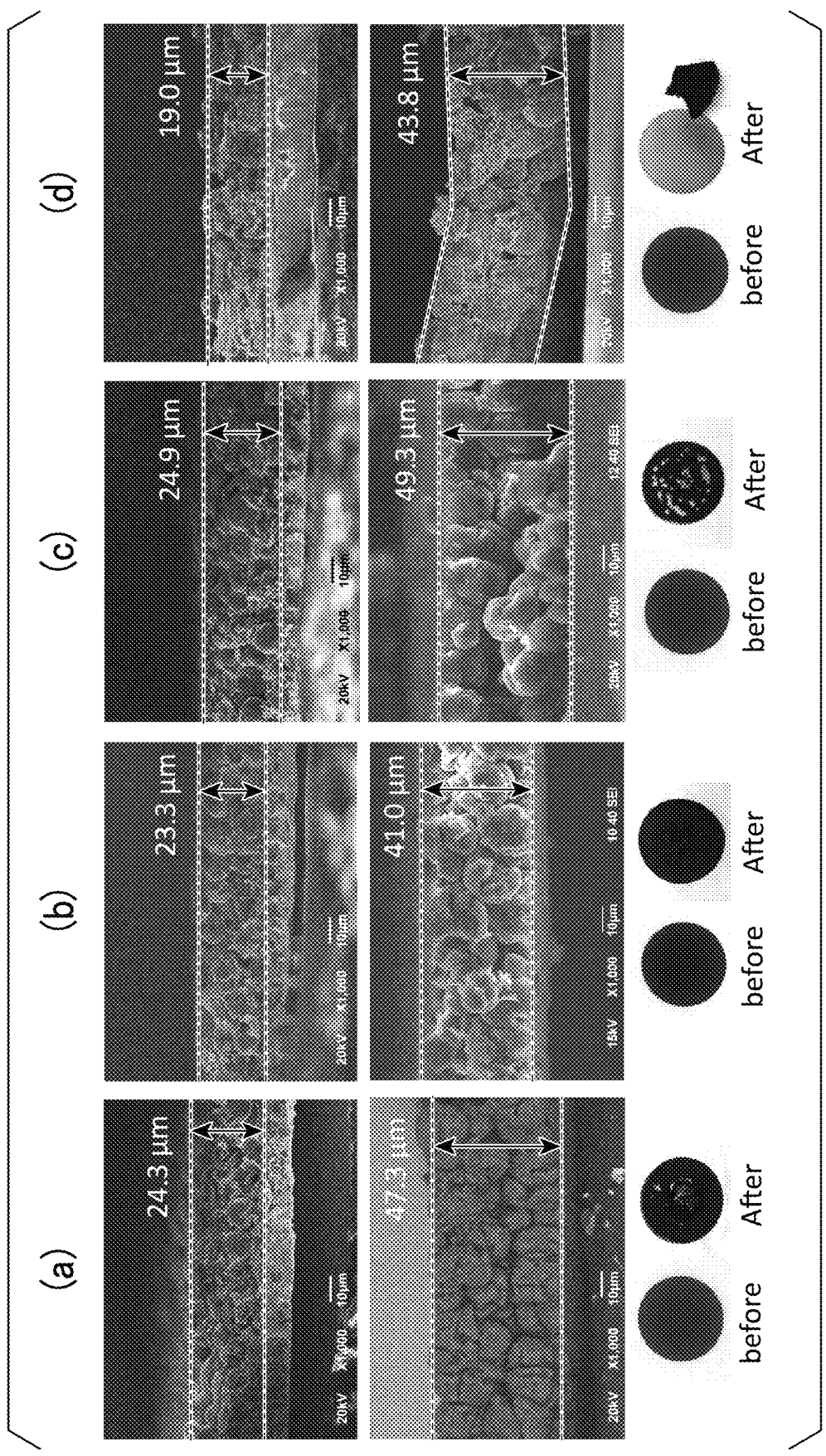
FIG. 12 shows SEM images of negative electrode active materials for a rechargeable battery of Examples 2 and 4 and Comparative Examples 2 and 3 obtained after a cycle test in FIG. 8.

FIG. 10 shows Nyquist plots measured by an AC impedance method in which measurement was performed after 5 or 50 charging and discharging cycle tests (After5, After50) under conditions of a current density of 500 mA/g. FIG. 11 is a diagram showing an equivalent circuit model for a circuit used for measurement in FIG. 10. Table 4 shows a summary of impedance parameters (coating resistance R$_{SEI}$ and electrolytic transfer resistance R$_{CT}$) analyzed according to the equivalent circuit model.

TABLE 4

| | $R_{SEI}$ (Ω) | | $R_{CT}$ (Ω) | |
| --- | --- | --- | --- | --- |
| | After 5 | After 50 | After 5 | After 50 |
| Example 2 | 0.9788 | 5.616 | 4.514 | 16.98 |
| Example 4 | 0.7338 | 6.569 | 4.701 | 12.38 |
| Comparative Example 2 | 0.8298 | 6.473 | 6.494 | 19.26 |
| Comparative Example 3 | 2.758 | 4.732 | 9.922 | 42.61 |

In Examples 2 and 4, even after 50 cycles, and deterioration of both $R_{SEI}$ and $R_{CT}$ was minimized, and the resistance lower than that of Comparative Examples 2 and 3 was maintained. Specifically, in Example 4, this tendency was remarkable. This was due to the fact that a fixing effect due to formation of amide bonds by EDC used in Example 4 was strong, volume expansion of silicon was more greatly minimized, and it was possible to greatly reduce peeling off of a conductivity aid due to volume expansion, crushing of the active material itself and the like.

FIGS. 12(a) to 12(d) show cross-sectional SEM images of silicon composite negative electrodes measured after 50 charging and discharging cycle tests under conditions of a current density of 500 mA/g in Examples 2 and 4, and Comparative Examples 2 and 3. In Example 4, peeling off from a current collector foil after 50 cycles was minimized, and the change in film thickness was smaller than that before the cycle test. It was found that, in Comparative Examples 2 and 3, after the cycle test, more voids were observed at the interface with the current collector foil and peeling off occurred. These results were due to the fact that a fixing effect due to formation of amide bonds by EDC used in Example 4 was strong, volume expansion of silicon was more greatly minimized, and it was possible to greatly reduce peeling off of a conductivity aid due to volume expansion, crushing of the active material itself and the like.

REFERENCE SIGNS LIST

100 Negative electrode for rechargeable battery
101 Current collector
101a One surface of current collector
102 Negative electrode active material for rechargeable battery
103, 103A Silicon composite
104 Self-assembled monolayer
105 Carbon compound
105A Carbon nanotube
105B Active ester compound
106 EDC
107 Ethanol
108 Amino organosilane
109 Pressing member
$L_1$ to $L_8$ Mixed solution
$R_1, R_2$ Region
T Thickness of self-assembled monolayer
$V_1, V_2$ Container
W Water

The invention claimed is:

1. A negative electrode active material for a rechargeable battery, comprising:
   a silicon composite composed of a silicon compound and at least one carbon material of graphite, non-graphitizable carbon, and soft carbon;
   a self-assembled monolayer which covers the surface of the silicon composite and has amino groups; and
   a carbon compound that is bonded to the self-assembled monolayer via the amino groups and contains carbon atoms as a main component,
   wherein the carbon compound is a carbon nanotube,
   positively charged functional groups ($-NH_3^+$) among amino groups formed on the self-assembled monolayer and carboxylic groups formed on the carbon nanotube are non-covalently bonded by an attractive force associated with an electrostatic interaction,
   the silicon composite has an amide bond with carboxylic groups of the carbon nanotubes,
   a plurality of the silicon composites are connected by the carbon nanotubes, and
   when waveforms of X-ray Photoelectron Spectroscopy (XPS) spectrums for each binding energy are separated, a first relative area ratio of a spectrum for the silicon composite having a non-covalent bond is larger than a second relative area ratio of a spectrum for the silicon composite having an amide bond.

2. The negative electrode active material for a rechargeable battery according to claim 1,
   wherein the silicon compound occupies 5% or more of the volume of the silicon composite.

3. The negative electrode active material for a rechargeable battery according to claim 1,
   wherein at least one of Si, SiO, and SiOx (x is a positive real number) is contained as the silicon compound in the silicon composite.

4. A rechargeable battery comprising the negative electrode active material according to claim 1.

5. A method for producing the negative electrode active material for a rechargeable battery according to claim 1, the method comprising:
   a process of forming the carbon compound having the carboxylic groups;
   a process of forming the silicon composite having the amino groups; and
   a process of mixing the carbon compound and the silicon composite in a liquid and bonding the carboxylic groups and the amino groups.

6. The method for producing the negative electrode active material for a rechargeable battery according to claim 5,
   wherein a condensing agent is added to the liquid.

7. The method for producing the negative electrode active material for a rechargeable battery according to claim 6,
   wherein 1-ethyl-3-(3-dimethylaminopropyl) carbodiimide hydrochloride is used as the condensing agent.

8. The negative electrode active material for a rechargeable battery according to claim 1,
   wherein the first relative area ratio is more than 43.7/20.2 times as large as the second relative area ratio.

\* \* \* \* \*